United States Patent
Dain et al.

(10) Patent No.: US 11,163,626 B2
(45) Date of Patent: *Nov. 2, 2021

(54) DEPLOYING A VALIDATED DATA STORAGE DEPLOYMENT

(71) Applicant: International Business Machines Corporation, Armonk, NY (US)

(72) Inventors: Joseph W. Dain, Vail, AZ (US); Stefan Lehmann, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 71 days.

This patent is subject to a terminal disclaimer.

(21) Appl. No.: 16/659,821

(22) Filed: Oct. 22, 2019

(65) Prior Publication Data

US 2020/0050382 A1 Feb. 13, 2020

Related U.S. Application Data

(63) Continuation-in-part of application No. 15/359,133, filed on Nov. 22, 2016, now abandoned.

(51) Int. Cl.
*G06F 11/00* (2006.01)
*G06F 11/07* (2006.01)
(Continued)

(52) U.S. Cl.
CPC ........ *G06F 11/0751* (2013.01); *G06F 3/0604* (2013.01); *G06F 3/067* (2013.01);
(Continued)

(58) Field of Classification Search
CPC ..... G06F 8/60; G06F 11/3688; G06F 11/3692
See application file for complete search history.

(56) References Cited

U.S. PATENT DOCUMENTS

| 7,167,914 | B2 | 1/2007 | Cohen et al. |
| 7,904,753 | B2 | 3/2011 | Athey et al. |
| 8,683,424 | B2 | 3/2014 | Colombo et al. |

(Continued)

FOREIGN PATENT DOCUMENTS

WO 2014/147607 A1 9/2014

OTHER PUBLICATIONS

M. Chu et al., "Distributed In Vivo Testing of Software Applications", Department of Computer Science, Columbia University, New York NY 10027, 2008. 4 pages.

(Continued)

*Primary Examiner* — Joshua P Lottich
(74) *Attorney, Agent, or Firm* — Kunzler Bean & Adamson

(57) ABSTRACT

For deploying a validated data storage deployment is disclosed, a processor generates one or more desired data storage parameters for a data storage deployment. The data storage parameters identify data storage hardware and corresponding software prerequisites, an operating system, and drivers. In addition, the processor identifies a first validated data storage deployment that has a greatest number of the desired data storage parameters of the validated data storage deployments from the data storage parameter repository. In response to identifying the first validated data storage deployment, the processor deploys the validated data storage deployment at a data storage system by activating the data storage hardware and installing the software prerequisites, the operating system, and the drivers of the first validated data storage deployment on the data storage hardware at the data storage system via a network.

17 Claims, 13 Drawing Sheets

(51) Int. Cl.
  *G06F 3/06* (2006.01)
  *G06F 8/61* (2018.01)
(52) U.S. Cl.
  CPC .......... *G06F 3/0632* (2013.01); *G06F 3/0653* (2013.01); *G06F 8/61* (2013.01); *G06F 11/0727* (2013.01); *G06F 11/0787* (2013.01)

(56) References Cited

U.S. PATENT DOCUMENTS

| | | |
|---|---|---|
| 8,850,393 B2 | 9/2014 | Castro et al. |
| 8,924,521 B2 | 12/2014 | Acuna et al. |
| 8,978,015 B2 | 3/2015 | Pechanec et al. |
| 9,037,911 B2 | 5/2015 | Rentschler et al. |
| 9,081,747 B1 | 7/2015 | Tabieros et al. |
| 9,270,754 B2 | 2/2016 | Iyengar et al. |
| 9,552,259 B1 | 1/2017 | Chopra et al. |
| 9,678,731 B2 | 6/2017 | Hassine et al. |
| 10,135,871 B2 | 11/2018 | Luo et al. |
| 2005/0198631 A1 | 9/2005 | Bisher et al. |
| 2011/0078510 A1 | 3/2011 | Beveridge et al. |
| 2013/0138718 A1 | 5/2013 | Mallur et al. |
| 2014/0282031 A1 | 9/2014 | Hinterbichler et al. |
| 2015/0071123 A1 | 3/2015 | Sabaa |
| 2015/0378702 A1 | 12/2015 | Govindaraju |
| 2016/0062746 A1 | 3/2016 | Chiosi et al. |
| 2016/0110183 A1 | 4/2016 | Fu et al. |
| 2016/0269317 A1 | 9/2016 | Barzik et al. |
| 2017/0131899 A1 | 5/2017 | Billi et al. |
| 2017/0251058 A1 | 8/2017 | Zachariassen et al. |
| 2018/0054454 A1 | 2/2018 | Astigarraga |
| 2018/0074724 A1 | 3/2018 | Tremblay et al. |
| 2018/0143815 A1 | 5/2018 | Dain et al. |
| 2018/0143898 A1 | 5/2018 | Dain et al. |

OTHER PUBLICATIONS

H. Dai et al., "Configuration Fuzzing for Software Vulnerablility Detection", 2010 International Conference on Availability, Reliability and Security, 2010, 6 pages.

M. Diep et al., "Profiling Deployed Software: Strategic Probe Placement", DigitalCommons@UniversityofNebraska-Lincoln, CSE Technical Reports, Jan. 1, 2005, 25 pages.

A. Duarte et al., "Multi-Environment Software Testing on the Grid", AMC Digital Library, Proceedings of the 2006 workshop on Parallel and distributed systems.

A. Orso, "Monitoring, Analysis, and Testing of Deployed Software", AMC Digital Library, Proceedings of the FSE/SDP workshop on Future of software engineering research, Nov. 2010, 5 pages.

M. Stehr, "Fractionated Software for Networked Cyber-Physical Systems: Research Directions and Long-Term Vision", SRI International, Nov. 2011, 34 pages.

R. Sayyad et al., "Failure Analysis and Reliability Study of NAND Flash-Based Solid State Drives." Indonesian Journal of Electrical Engineering and Computer Science 2.2 (2016): 315-327.

T. Savor et al., "Continuous deployment at Facebook and OANDA." Proceedings of the 38th International Conference on Software Engineering Companion. ACM, 2016.

Mark Peters et al. "Key Reasons to Use Software-defined Storage— and How to Get Started"; IBM Whitepaper, IBM.com website; Feb. 2015, pp. 1-8.

Areret Anaby Tavor, "IBM Watson Tradeoff Analytics—General Availability"; IBM.com webstie [full URL in reference]; May 28, 2015, pp. 1-5.

"List of Patents or Patent Applications Treated as Related" AppendixP, Oct. 22, 2019, p. 1.

| Log Entry 355 |
|---|
| Log Entry 355 |
| Log Entry 355 |
| Log Entry 355 |

| Data Storage Deployment Identifier 201 |
|---|
| Component Identifier 210 |
| Discrepancy Data 240 |
| Performance Data 245 |
| Failure Data 247 |

175

| Data Storage Deployment Identifier 201 |
| Data Storage Component 205 |
| Data Storage Component 205 |
| Data Storage Element 207 |
| Data Storage Element 207 |

Filter Threshold 209

Trade-off Analytics Function 211

250

| | | |
|---|---|---|
| 215a — Element Identifier 255 | Element Version 260 | Element Availability 265 |
| 215b — Element Identifier 255 | Element Version 260 | Element Availability 265 |
| 215c — Element Identifier 255 | Element Version 260 | Element Availability 265 |
| 215d — Element Identifier 255 | Element Version 260 | Element Availability 265 |

FIG. 3A

DEPLOYING A VALIDATED DATA STORAGE DEPLOYMENT

CROSS-REFERENCE TO RELATED APPLICATIONS

This is a continuation-in-part application of and claims priority to U.S. patent application Ser. No. 15/359,133 entitled "DEPLOYING A VALIDATED SOFTWARE DEFINED STORAGE SOLUTION" and filed on Nov. 22, 2016 for Joseph W. Dain, which is incorporated herein by reference.

FIELD subject matter disclosed herein relates to data storage and more particularly relates to deploying a validated data storage deployment.

BACKGROUND

Data storage deployments are often manually selected, deployed, and tuned.

BRIEF SUMMARY

An apparatus for deploying a validated data storage deployment is disclosed. The apparatus includes a processor and a memory that stores code that is executable by the processor. The processor generates one or more desired data storage parameters for a data storage deployment. The data storage parameters identify data storage hardware and corresponding software prerequisites, an operating system, and drivers for deployment of the data storage hardware at a data storage system to provide the data storage from the data storage system. The processor retrieves data storage parameters of validated data storage deployments from a data storage parameter repository. Each validated data storage deployment is successful deployed. In addition, the processor identifies a first validated data storage deployment that has a greatest number of the desired data storage parameters of the validated data storage deployments from the data storage parameter repository. In response to identifying the first validated data storage deployment, the processor deploys the validated data storage deployment at the data storage system by activating the data storage hardware and installing the software prerequisites, the operating system, and the drivers of the first validated data storage deployment on the data storage hardware at the data storage system via a network. A method and computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3A is a schematic block diagram illustrating one embodiment of an availability matrix;

DETAILED DESCRIPTION

Figure 1:
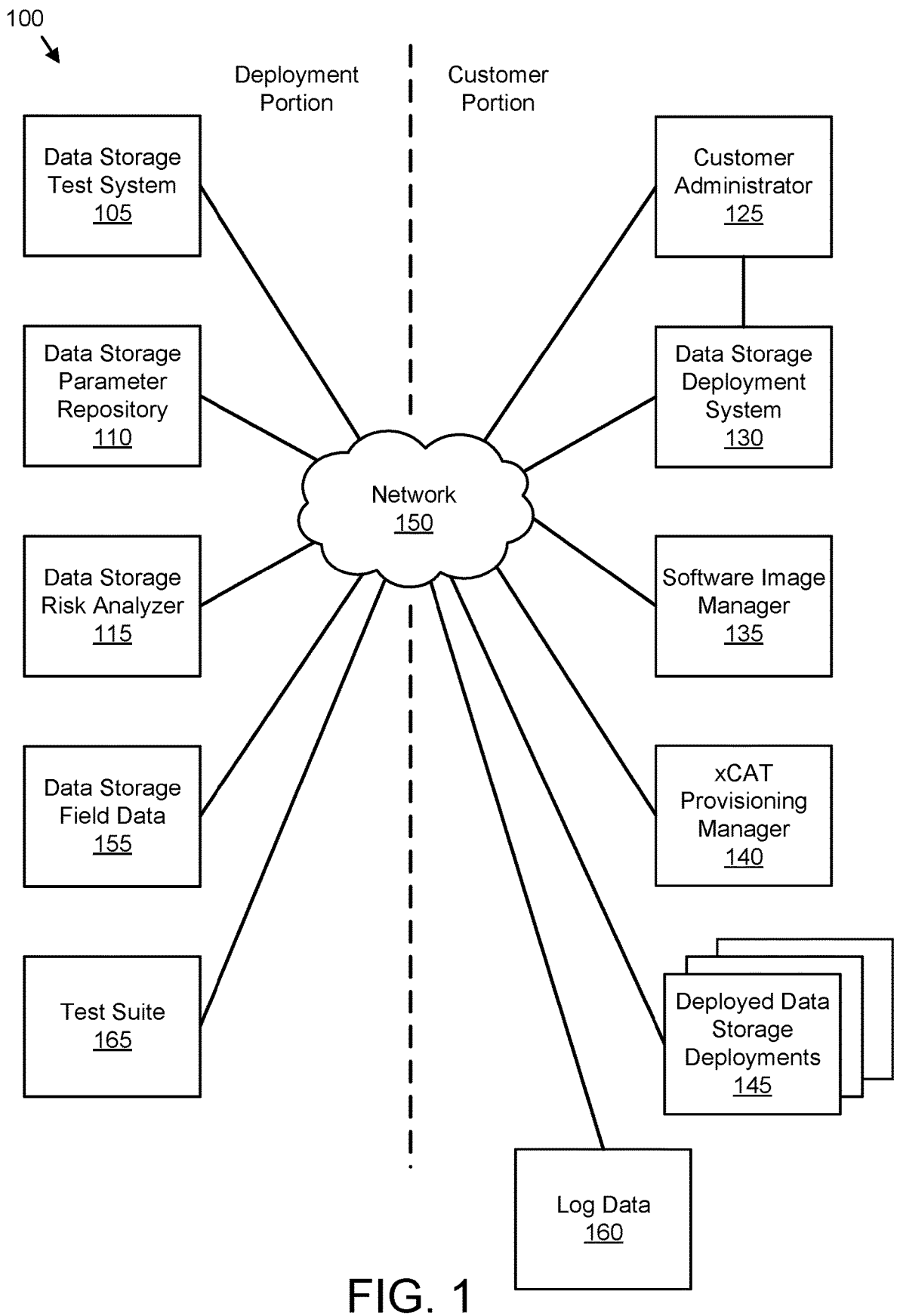
FIG. 1 is a schematic block diagram illustrating one embodiment of a data storage deployment system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 is a schematic block diagram illustrating one embodiment of a data storage deployment system 100. The system 100 may deploy data storage deployments to customers. In the depicted embodiment, the system 100 is organized into a deployment portion and the customer portion. The deployment portion may deploy an data storage deployment to the customer portion. The system 100 includes an data storage test system 105, a repository 110, an data storage risk analyzer 115, data storage field data 155, a test suite 165, a customer administrator 125, an data storage deployment system 130, a software image manager 135, an xCAT provisioning manager 140, one or more deployed data storage deployments 145, log data 160, and a network 150.

An data storage deployment may provide flexible, highly configurable data storage for the customer. Unfortunately, the flexibility and configurability of the data storage deployment may result in the deployment of data storage deployments that are prone to operational problems and failures. The embodiments described herein validate data storage deployments and make the validated data storage deployments available for deployment to customers as will be described hereafter.

The system 100 may deploy data storage deployments from the deployment portion over the network 150 to the customer portion. The network 150 may comprise the Internet, a wide-area network, a local area network, a Wi-Fi network, a mobile telephone network, and combinations thereof. The software image manager 135 may receive an data storage deployment. The data storage deployment system 130 may deploy the data storage deployment as directed by the customer administrator 125. Hardware and software elements of the data storage deployment may be provided by the xCAT provisioning manager 140. The one or more deployed data storage deployments 145 may provide data storage for the customer. Notifications, error messages, and the like relating to the operation of the deployed data storage deployments 145 may be stored in the log data 160.

The data storage test system 105 may validate data storage deployments. In one embodiment, the data storage test system 105 employs the test suite 165 to validate data storage deployments. Validated data storage deployments may be stored in the data storage parameter repository 110.

The data storage risk analyzer 115 may evaluate the risks of deploying an data storage deployment. In one embodiment, the data storage risk analyzer 115 evaluates the risks of deploying an data storage deployment that has not been validated by the data storage test system 105 using the test suite 165. Based on the evaluation of the risks, and unvalidated data storage deployment may be deployed.

The log data 160 and other information from the operation of the deployed data storage deployments 145 may be communicated to the data storage field data 155. The data storage field data 155 may be employed by the data storage risk analyzer 115 to evaluate the risk of deploying an data storage deployment.

Figure 2A:
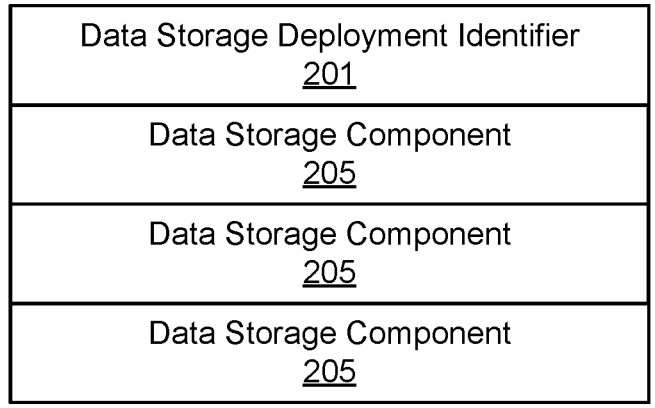
FIG. 2A is a schematic block diagram illustrating one embodiment of an data storage deployment.

FIG. 2A is a schematic block diagram illustrating one embodiment of an data storage deployment 200. The data storage deployment 200 may be organized as a data structure in a memory. In the depicted embodiment, the data storage deployment 200 includes an data storage deployment identifier 201 and a plurality of data storage components 205. The data storage deployment identifier 201 may uniquely identify an data storage deployment 200. The data storage deployment identifier 201 may be an index, an alphanumeric string, a key in a key-value store, or any other similar type of indexing method. An data storage component 205 may be an operating system, a hardware device, a driver, a software application, or combinations thereof. The data storage component 205 is described in more detail in FIG. 5B.

Figure 2B:
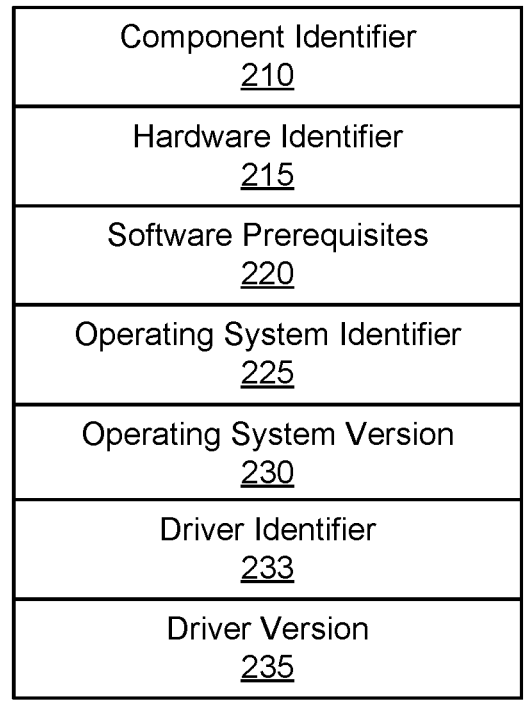
FIG. 2B is a schematic block diagram illustrating one embodiment of an data storage component.

FIG. 2B is a schematic block diagram illustrating one embodiment of the data storage component 205. The data storage component 205 may be organized as a data structure in a memory. In the depicted embodiment, the data storage component 205 includes a component identifier 210, a hardware identifier 215, software prerequisites 220, an operating system identifier 225, an operating system version 230, a driver identifier 233, and a driver version 235.

The component identifier 210 may uniquely identify the data storage component 205. The component identifier 210 may be an index, an alphanumeric string, a key in a key-value store, or any other similar type of indexing method. The hardware identifier 215 may identify one or more hardware devices. The hardware devices may be integral to the data storage component 205. Alternatively, the hardware devices may be prerequisites required by the data storage component 205.

The software prerequisites 220 may identify one or more software instances that are required by the data storage component 205. In one embodiment, the software prerequisites 220 identify one or more combinations of software instances that could each be employed by the data storage component 205.

The operating system identifier 225 identifies an operating system that is required by the data storage component 205. The operating system version 230 identifies one or more required versions of the operating system.

The driver identifier 233 identifies a software and/or firmware driver for the data storage component 205. The driver version 235 identifies one or more required versions of the driver.

The hardware devices, software instances, operating systems, and device drivers of the data storage component 205 may be referred to generically as elements. Thus, the data storage component 205 comprises a plurality of elements.

One or more of the hardware identifier 215, software prerequisites 220, operating system identifier 225, operating system version 230, driver identifier 233, and driver version identifier 235 may have a NULL value that indicates that the element is not used and/or not required.

Figure 2C:
FIG. 2C is a schematic block diagram illustrating one embodiment of log data.

FIG. 2C is a schematic block diagram illustrating one embodiment of the log data 160. The log data 160 may be organized as a data structure in a memory. In the depicted embodiment, the log data 160 includes one or more log entries 355. Each log entry 355 may comprise one or more of a status report, a notification, and an error message. The log entries 355 may be recorded for deployed data storage deployments 145. In one embodiment, each log entry 355 includes an data storage deployment identifier 201. Alternatively, the log data 160 may include the data storage deployment identifier 201. In a certain embodiment, the log data 160 includes information from which the data storage deployment identifier 201 may be calculated.

Figure 2D:
FIG. 2D is a schematic block diagram illustrating one embodiment of data storage field data.

FIG. 2D is a schematic block diagram illustrating one embodiment of the data storage field data 155. The data storage field data 155 may be organized as a data structure in a memory. In the depicted embodiment, an data storage field data instance 155 is shown that includes the data storage deployment identifier 201, the component identifier 210, discrepancy data 240, performance data 245, and failure data 247. The data storage field data 155 may include a plurality of data storage field data instances 155.

The discrepancy data 240 may record discrepancies, errors, problem reports, failures, and the like associated with the data storage deployment 200 identified by the data storage deployment identifier 201 and/or the data storage component 205 identified by the component identifier 210. In one embodiment, the discrepancy data 240 is calculated as a function of the failure data 247 such as hard failures and soft failures in the failure data 247 and a hard failure threshold and the soft failure threshold. In a certain embodiment, hard failures are failures that exceed the hard failure threshold. In addition, soft failures may be failures that exceed the soft failure threshold but do not exceed the hard failure threshold.

The performance data 245 may record one or more performance metrics associated with the data storage deployment 200 identified by the data storage deployment identifier 201 and/or the data storage component 205 identified by the component identifier 210. The failure data 247 is described in more detail in FIG. 3B.

Figure 2E:
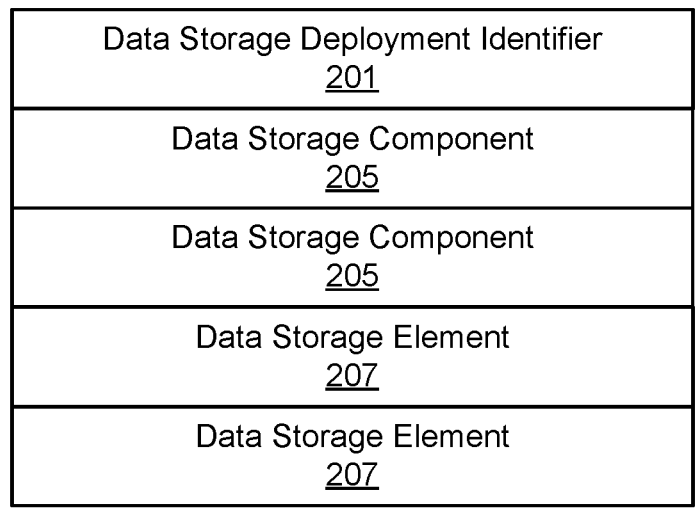
FIG. 2E is a schematic block diagram illustrating one embodiment of data storage parameters.
Figure 2E:
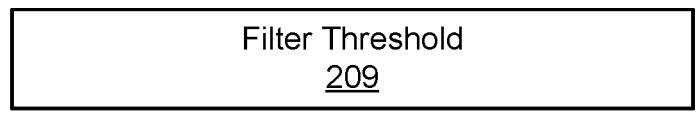
Figure 2E:
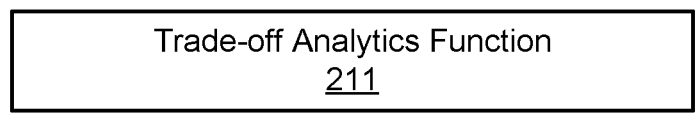

FIG. 2E is a schematic block diagram illustrating one embodiment of data storage parameters 175. The data storage parameters 175 may be organized as a data structure in a memory. In the depicted embodiment, the data storage parameters 175 included an data storage deployment identifier 201, data storage components 205, and data storage elements 207. However, the data storage parameters 175 may include no data storage components 205 or no data storage elements 207. The data storage deployment identifier 201 may identify a model and/or desired data storage deployment 200. Each data storage element 207 may identify a portion of an data storage component 205. For example, an data storage element 207 may identify a hard disk drive model with a hardware identifier 215 without identifying software prerequisites 220, an operating system identifier 225, or a driver identifier 230.

The data storage parameters 175 may be specified by the customer administrator 125, the data storage risk analyzer 115, and/or a computer to provide a preliminary description of the model data storage deployment 200 and/or the desired data storage deployment 200. A filter threshold 209 may be created for the data storage parameters 175 and used to identify a validated data storage deployment 200 as will be described hereafter.

In one embodiment, a trade-off analytics filter 211 may be calculate a deployment risk for the data storage parameters 175 and/or an data storage deployment 200. The trade-off analytics function 211 may be calculated as a function of data storage components 205, discrepancy data 240, and performance data 245. In a certain embodiment, the trade-off analytics function 211 is further calculated as a function of failure data 247. In one embodiment, the trade-off analytics function 211 is a trade-off analytics Application Program Interface (API) such as the WATSON® trade-off analytics API. The trade-off analytics function 211 may be trained using training data.

FIG. 3A is a schematic block diagram illustrating one embodiment of an availability matrix 250. The availability matrix 250 may record the availability of data storage elements 207 of data storage components 205. The data storage parameter repository 110 may store the availability matrix 250. The availability matrix 250 may be organized as a data structure in a memory. In the depicted embodiment, the availability matrix 250 includes a plurality of availability matrix entries 215. Each availability matrix entry 215 includes an element identifier 255, an element version 260, and an element availability 265. The availability matrix 250 may store an entry 215 for each data storage element 207 of each data storage component 205.

The element identifier 255 may identify an data storage element 207 that is used in one or more data storage components 205. The element identifier 255 may be a software identifier, hardware model number, or combinations thereof. The element version 260 may specify a unique version of the data storage element 207. The element availability 265 may specify whether or not the data storage element 207 is available. For example, if a hard disk drive identified by the element identifier 255 with a model number specified by the element identifier 255 cannot be procured and/or cannot be deployed, the element availability 265 may be set to "unavailable." However, if the hard disk drive can be procured and/or can be deployed, the element availability 265 may be set to "available."

Figure 3B:
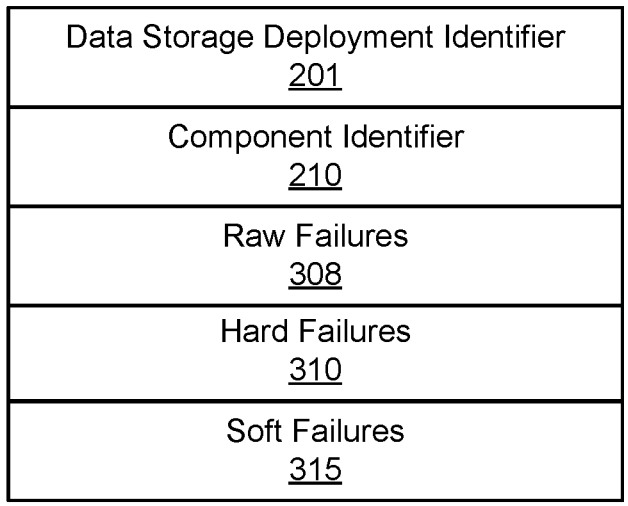
FIG. 3B is a schematic block diagram illustrating one embodiment of failure data.

FIG. 3B is a schematic block diagram illustrating one embodiment of the failure data 247. The failure data 247 may be organized as a data structure in a memory. In one embodiment, the failure data 247 is stored with the data storage field data 155. In the depicted embodiment, the failure data 247 includes the data storage deployment identifier 201, the component identifier 210, raw failures 308, hard failures 310, and soft failures 315.

The raw failures 308 may comprise uncategorized failures from the log data 160. In one embodiment, the hard failures 310 record a number of raw failures 308 that exceed the hard failure threshold for the data storage deployment 200 identified by the data storage deployment identifier 201 and/or the data storage component 205 identified by the component identifier 210. The soft failures 315 may record a number of raw failures 308 that exceed the soft failure threshold for the data storage deployment 200 identified by the data storage deployment identifier 201 and/or the data storage component 205 identified by the component identifier 210.

Figure 3C:
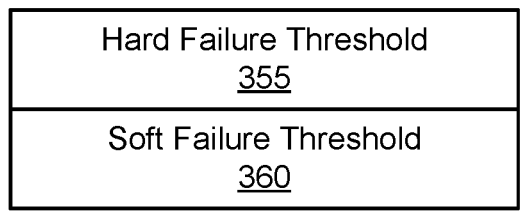
FIG. 3C is a schematic block diagram illustrating one embodiment of threshold data.

FIG. 3C is a schematic block diagram illustrating one embodiment of threshold data 350. The threshold data 350 may be organized as a data structure in a memory. In one embodiment, the threshold data 350 is stored with the data storage field data 155. In the depicted embodiment, the threshold data 350 includes the hard failure threshold 355 and the soft failure threshold 360.

The hard failure threshold 355 may specify one or more of a type of failure and/or a quantity of failures. When the hard failure threshold 355 is exceeded, a hard failure 310 may be identified. The soft failure threshold 360 may specify one or more of a type of failure and a quantity of failures. When the soft failure threshold 360 is exceeded, a soft failure 315 may be identified. In one embodiment, if both the hard failure threshold 355 and the soft failure threshold 360 are exceeded, a hard failure 310 is identified.

Figure 4A:
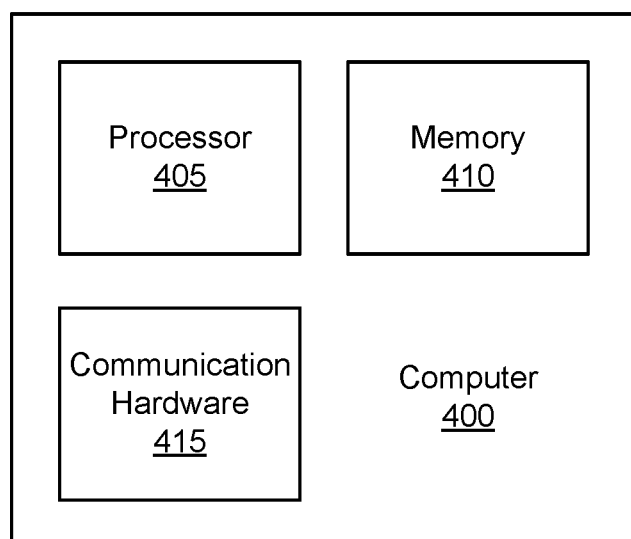
FIG. 4A is a schematic block diagram illustrating one embodiment of a computer.

FIG. 4A is a schematic block diagram illustrating one embodiment of a computer 400. The computer 400 may be embodied in one or more of the data storage test system 105, the data storage parameter repository 110, the data storage risk analyzer 115, the customer administrator 125, the data storage deployment system 130, the software image manager 135, and the xCAT provisioning manager 140. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices.

Figure 4B:
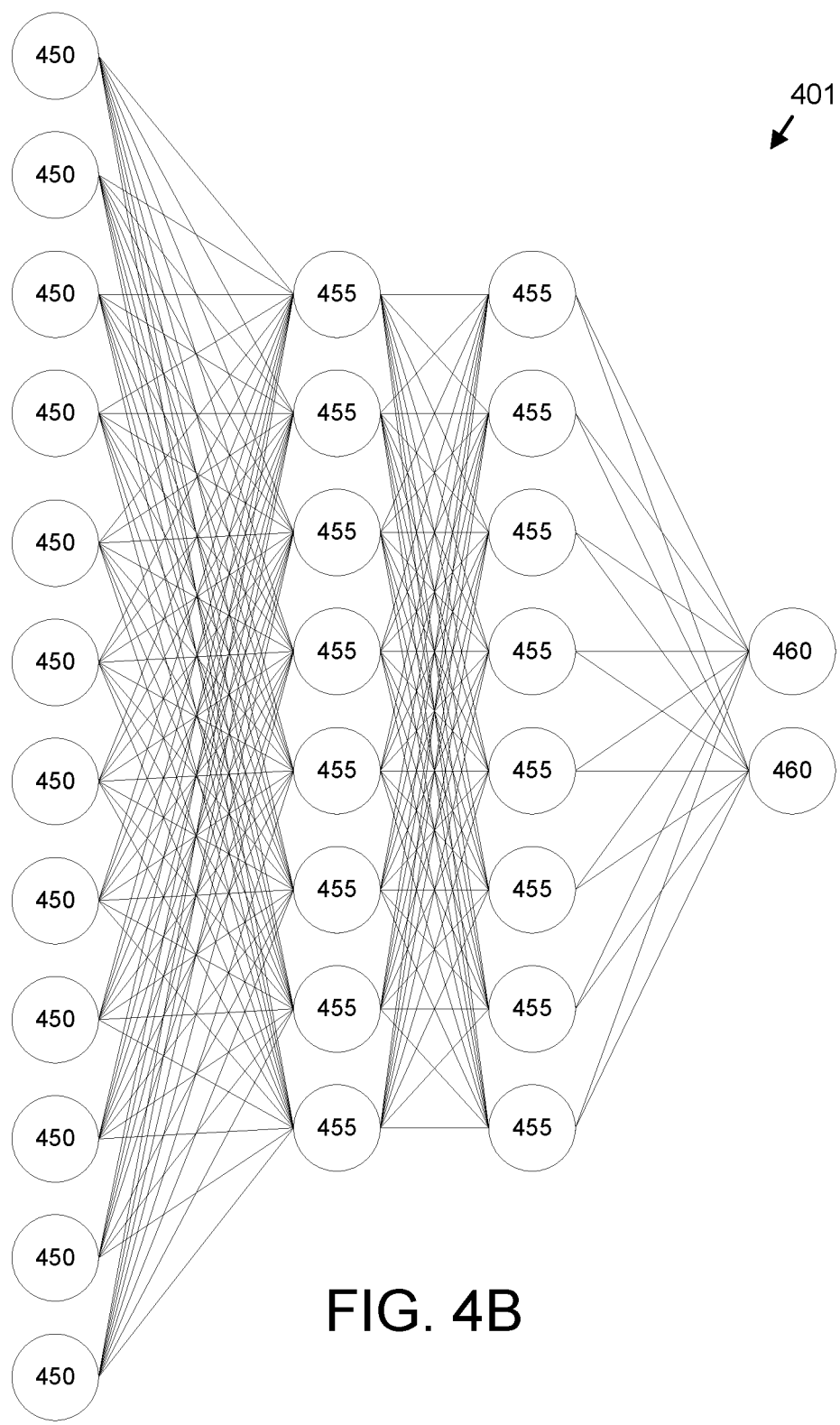
FIG. 4B is a schematic block diagram illustrating one embodiment of a neural network.

FIG. 4B is a schematic block diagram illustrating one embodiment of a neural network 401. The neural network 401 includes a plurality of input nodes 450, a plurality of hidden nodes 455, and a plurality of output nodes 460. The output nodes 460 may represent one or more results and/or conclusions. In one embodiment, the output nodes 460 define an data storage deployment 200. The input data may be encoded and presented to the input nodes 450. In one embodiment, the input data may be data storage field data 155. The hidden nodes 455 and the output nodes 460 may be trained using training data. The training data may comprise the data storage field data and corresponding component identifiers 210 and element identifiers 255. After the neural network 401 is trained, the encoded data storage field data 155 may be presented to the input nodes 450 to generate recommend data storage deployments 200 at the output nodes 460. In an alternate embodiment, one or more of a decision tree, a sum of weighted products, and the like may be used to generate the recommended data storage deployments 200.

Figure 5A:
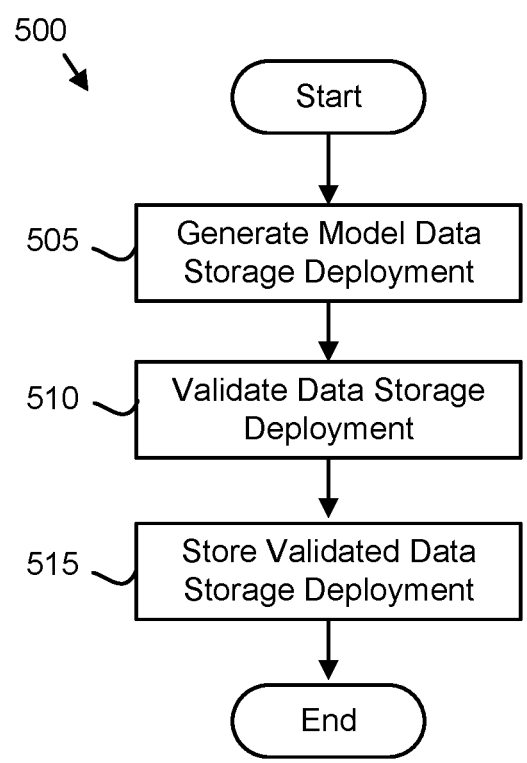
FIG. 5A is a schematic flow chart diagram illustrating one embodiment of a validation method.

FIG. 5A is a schematic flow chart diagram illustrating one embodiment of a validation method 500. The method 500 may validate and store an data storage deployment 200. The method 500 may be performed by the computer 400 and/or by the processor 405 of the computer 400. In addition, the method 500 may be performed by a computer readable storage medium such as the memory 410 storing code that is executable by the processor 405.

The method 500 starts, and in one embodiment, the processor 405 generates 505 a model data storage deployment 200. In one embodiment, the model data storage deployment 200 is generated 505 based on one or more desired data storage parameters 175 for a desired data storage deployment 200 supplied by the customer administrator 125. In addition, the data storage risk analyzer 115 analyze the one or more desired data storage parameters 175 to generate 505 the model data storage deployment 200. In one embodiment, the data storage risk analyzer 115 employs the neural network 401 to analyze the one or more desired data storage parameters 175 and generate the model data storage deployment 200.

The processor 405 may validate 510 the model data storage deployment 200 using the test suite 165. In one embodiment, the data storage test system 105 autonomously performs the test suite 165 on the model data storage deployment 200. If the model data storage deployment 200 fails the test suite 165, the model data storage deployment 200 may be iteratively modified until the model data storage deployment 200 passes the test suite 165.

In one embodiment, the processor 405 may validate 510 the model data storage deployment 200 using the availability matrix 250. The processor 405 may determine that each element of each data storage component 205 of the model data storage deployment 200 is available for deployment. In a certain embodiment, the model data storage deployment 200 must be both validated by the test suite 165 and the availability matrix 250 to be considered fully validated.

In response to validating the model data storage deployment 200, the processor 405 may store the validated data storage deployment 200 in the data storage parameter repository 110 and the method 500 ends.

Figure 5B:
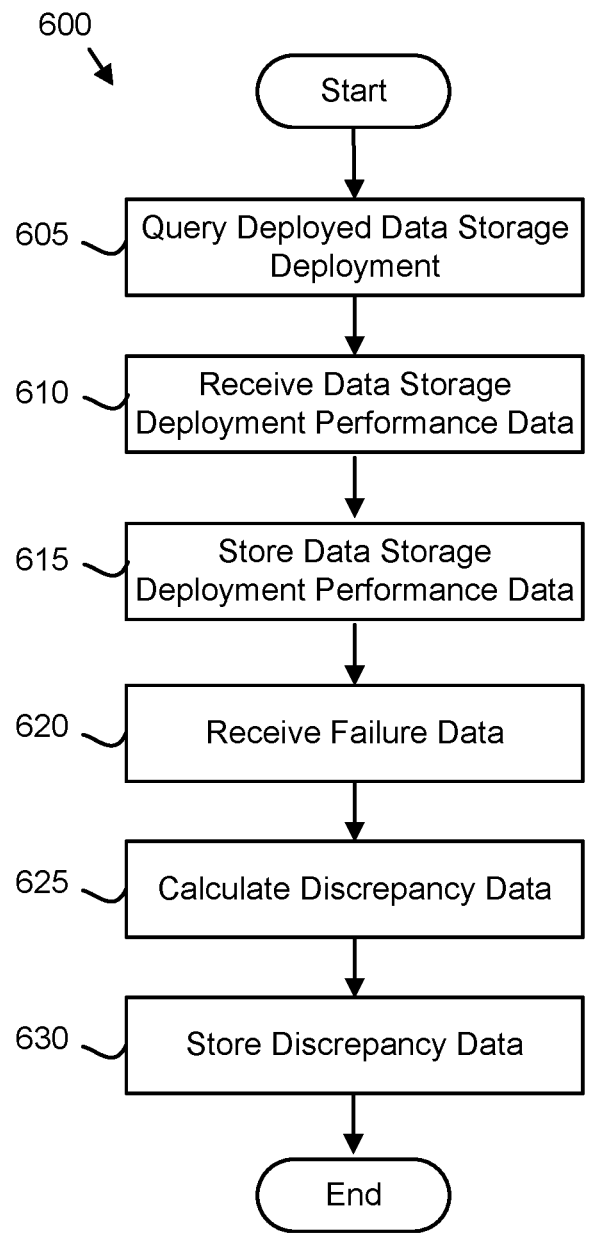
FIG. 5B is a schematic flow chart diagram illustrating one embodiment of discrepancy data method.

FIG. 5B is a schematic flow chart diagram illustrating one embodiment of discrepancy data method 600. The method 600 may store performance data 245 from a deployed data storage deployment 145 and calculate and store discrepancy data 240 from the deployed data storage deployment 145. The method 600 may be performed by the computer 400 and/or by the processor 405 of the computer 400. In addition, the method 600 may be performed by a computer readable storage medium such as the memory 410 storing code that is executable by the processor 405.

The method 600 starts, and in one embodiment, the processor 405 queries 605 a deployed data storage deployment 145 for performance data 245. The processor 405 may query 605 the deployed data storage deployment 145 through the network 150. In one embodiment, a query request includes one or more authorization credentials. In a certain embodiment, the processor 405 also queries 605 the deployed data storage deployment 145 for failure data 247. The failure data 247 may be embodied in the log data 160.

The processor 405 further receives 610 the performance data 245 from the deployed data storage deployment 145. In a certain embodiment, the performance data 245 is included in the log data 160. The processor 405 may store 615 the performance data 245. In one embodiment, the performance data 245 is stored 615 in the data storage field data 155.

The processor 405 may receive 620 the failure data 247. The failure data 247 may be included in the log data 160. The processor 405 may further calculate 625 the discrepancy data 240 from the failure data 247. In one embodiment, the processor 405 generates a training data set from the log data 160 that includes outputs of an data storage deployment identifier 201 and a component identifier 210 for previous failure data 247, hard failures 310 for the previous failure data 247, and soft failures 315 for the previous failure data 247. The processor 405 may further train the neural network 401 using the training data set. The processor 405 may calculate 625 the discrepancy data 240 from the failure data 247 of the log data 160 by encoding the log data 160 and introducing the encoded log data 160 to the neural network 401.

In an alternative embodiment, the processor 405 may identify a discrete error message within the failure data 247. The processor 405 may further identify the data storage deployment identifier 201 and the component identifier 210 from the error message. In one embodiment, the processor 405 calculate 625 whether a failure of the error message exceeds the hard failure threshold 355. If the failure exceeds the hard failure threshold 355, the processor 405 may identify a hard failure 310. In one embodiment, the calculation 625 stops after identifying one hard failure 310. The processor 405 may further calculate 625 whether the failure of the error message exceeds the soft failure threshold 360. If the failure exceeds the soft failure threshold 360 and does not exceed the hard failure threshold 355, the processor 405 may identify a soft failure 315.

In one embodiment, the processor 405 employs a heuristic algorithm that analyzes the discrete error message and two to five preceding error messages to calculate 625 the hard failures 310 and the soft failures 315. The processor 405 may store 630 the discrepancy data 240 to the data storage field data 155 and the method 600 ends.

Figure 5C:
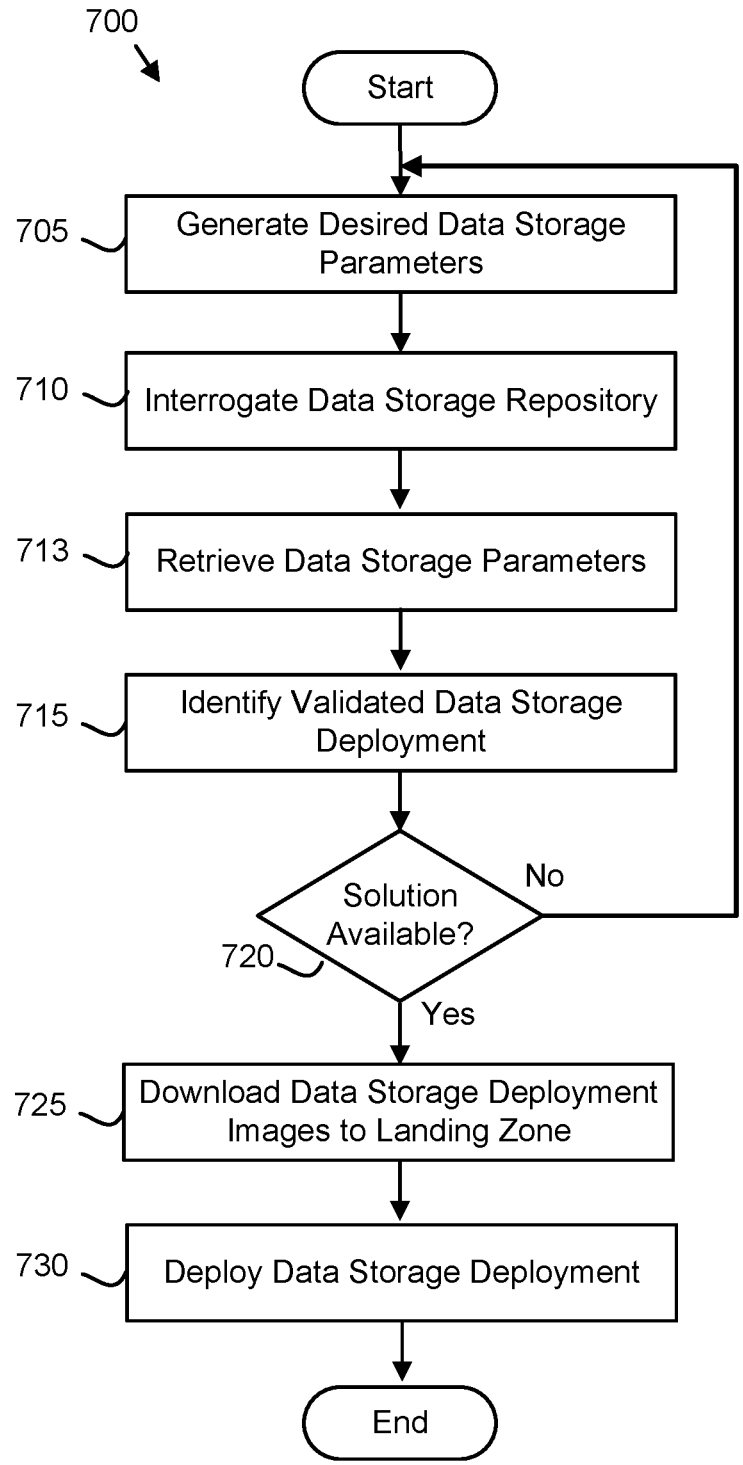
FIG. 5C is a schematic flow chart diagram illustrating one embodiment of an data storage deployment method.

FIG. 5C is a schematic flow chart diagram illustrating one embodiment of an data storage deployment method 700. The method 700 may identify a validated data storage deployment 200. In addition, the method 700 may deploy the validated data storage deployment 200. The method 700 may be performed by the computer 400 and/or by the processor 405 of the computer 400. In addition, the method 700 may be performed by a computer readable storage medium such as the memory 410 storing code that is executable by the processor 405.

The method 700 starts, and in one embodiment, the processor 405 may generate 705 one or more desired data storage parameters 175. The data storage parameters 175 may identify data storage hardware using the hardware identifier 215 and corresponding software prerequisites 220, an operating system using the operating system identifier 225, and drivers using the driver identifier 233 for deployment of the data storage hardware at a system to provide the data storage from the system. The desired data storage parameters 175 may be communicated from the customer administrator 125 to the processor 405 and/or data storage parameter repository 110. Alternatively, the desired data storage parameters 175 may be generated 705 based on a desired data storage deployment 200.

The processor 405 may interrogate 710 the data storage parameter repository 110. The data storage parameter repository 110 may be interrogated 710 using the filter threshold 209. The filter threshold 209 may be applied to the data storage deployments 200 in the data storage parameter repository 110. Alternatively, the data storage parameter repository 110 may be interrogated 710 with the desired data storage parameters 175. In one embodiment, the desired data storage parameters 175 are used as indices to the data storage parameter repository 110. In one embodiment, a validated data storage deployment 200 that has a greatest number of the desired data storage parameters 175 of the validated data storage deployments 200 from a data storage parameter repository 110 satisfies the filter threshold 209.

The processor 405 may retrieve 713 data storage parameters 175 of validated data storage deployments 200 from a data storage parameter repository 110. Each of the validated data storage deployments 200 may have been successful deployed to a system.

The processor 405 further identifies 715 a validated data storage deployment 200 from the data storage parameter repository 110. In a certain embodiment, the validated data storage deployment 200 comprises each of the desired data storage parameters 175. Alternatively, the validated data storage deployment 200 may include a greatest number of desired data storage parameters 175.

In one embodiment, the processor identifies 715 a validated data storage deployment 200 from the data storage parameter repository 110 that has no hard failures 310 and a number of soft failures 315 that is less than a deployment threshold. For example, the deployment threshold may be in the range of one to five soft failures 315.

In one embodiment, the processor 405 identifies 715 the validated data storage deployment 200 that satisfies the filter threshold 209. The identification 715 of the validated data storage deployment 200 using the filter threshold is described in more detail in FIG. 5D.

The processor 405 may determine 720 if the validated data storage deployment 200 is available. In one embodiment, the processor 405 uses the availability matrix 250 to determine that each element 207 of each data storage component 205 of the validated data storage deployment 200 is available. If each data storage element 207 or each data storage component 205 of the validated data storage deployment 200 is not available, the processor 405 may generate 705 one or more desired data storage parameters 175.

If each element 207 of each data storage component 205 of the validated data storage deployment 200 is available, the processor 405 may download 725 each software image of the validated data storage deployment 200 to a landing zone of the software image manager 135. The processor 405 may activate the data storage hardware and install the software prerequisites, the operating system, and the drivers of validated data storage deployment on the data storage hardware at the system via the network 150. In addition, the processor may deploy 730 the validated data storage deployment 200 by deploying the software images and the method 700 ends. In one embodiment, the data storage deployment system 130 and/or the xCAT provisioning manager 140 deploy 730 the software images.

Figure 5D:
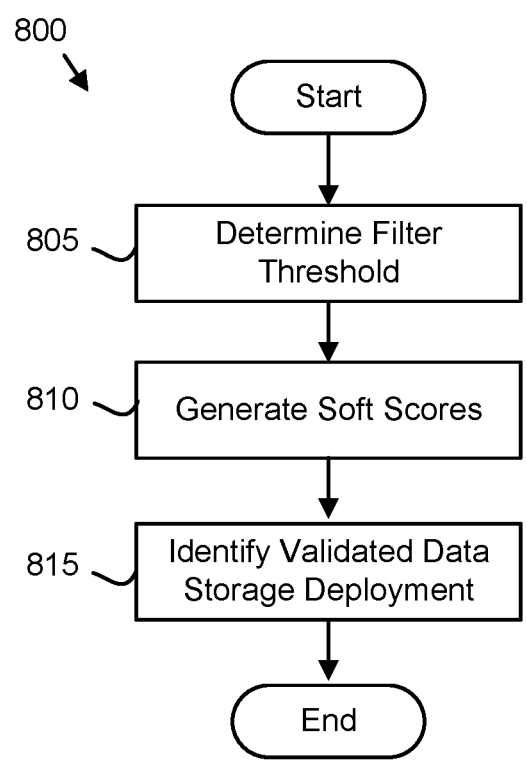
FIG. 5D is a schematic flowchart diagram illustrating one embodiment of an data storage deployment identification method.

FIG. 5D is a schematic flowchart diagram illustrating one embodiment of an data storage deployment identification method 800. The method 800 may identify a validated data storage deployment 200. The method 800 may perform step 715 of the method 700 of FIG. 5C. The method 800 may be performed by the computer 400 and/or by the processor 405 of the computer 400. In addition, the method 800 may be performed by a computer readable storage medium such as the memory 410 storing code that is executable by the processor 405.

The method 800 starts, and in one embodiment, the processor 405 determines 805 the filter threshold 209 from filter training data. The filter training data may be based on log data 160 and the resulting failure data 247, performance data 245, and/or discrepancy data 240. In one embodiment, the filter training data comprises data storage components 205 and data storage elements 207 associated with the component identifier 210 as inputs and the discrepancy data 240 and performance data 245 as outputs. The filter training data may be used to train a trade-off analytics API. Alternatively, the filter training data may be used to train the neural network 401. The trained API and/or the trained neural network 401 may comprise the filter threshold 209.

The processor 405 may generate 810 a soft score for each data storage deployment 200 in the data storage parameter repository 110. The soft score may comprise one or more of a discrepancy data forecast 240 and a performance data forecast 245. In one embodiment, each soft score is generated 810 by analyzing the data storage components 205 and data storage elements 207 of each data storage deployment 200 against the filter threshold 209.

In one embodiment, the processor 405 identifies 815 the validated data storage deployment 200 with the highest soft score that satisfies the filter threshold 209 and the method 800 ends. The processor 405 may sort each data storage deployment 200 in the data storage parameter repository 110 and identify 815 the data storage deployment 200 with the highest soft score.

The embodiments validate data storage deployments 200 and store the validated data storage deployments 200 in the data storage parameter repository 110. In addition, the embodiments generate desired data storage parameters 175 for an data storage deployment and identify the validated data storage deployment 200 from the data storage parameter repository 110 that satisfies the filter threshold 209. As a result, the validated data storage deployment 200 is more likely to be robust and perform as desired. In addition, the embodiments deploy the validated data storage deployment 200 in response to identifying the validated data storage deployment 200.

Figure 6:
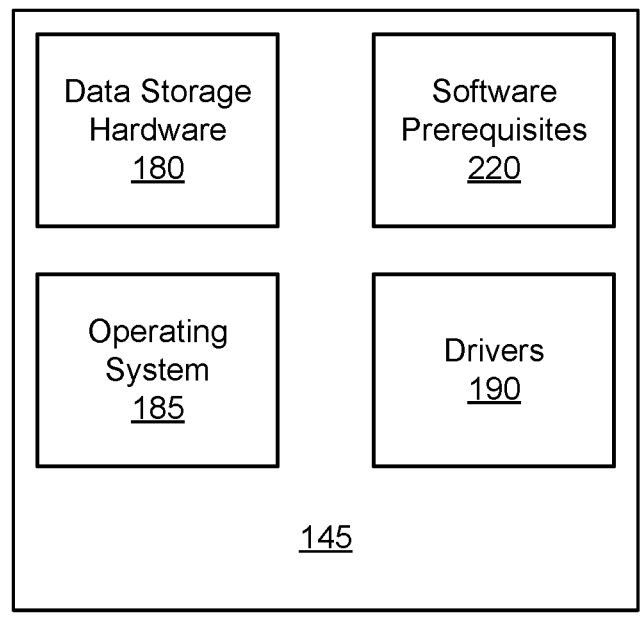
FIG. 6 is a schematic block diagram illustrating one embodiment of data storage system with data storage deployments.
Figure 6:
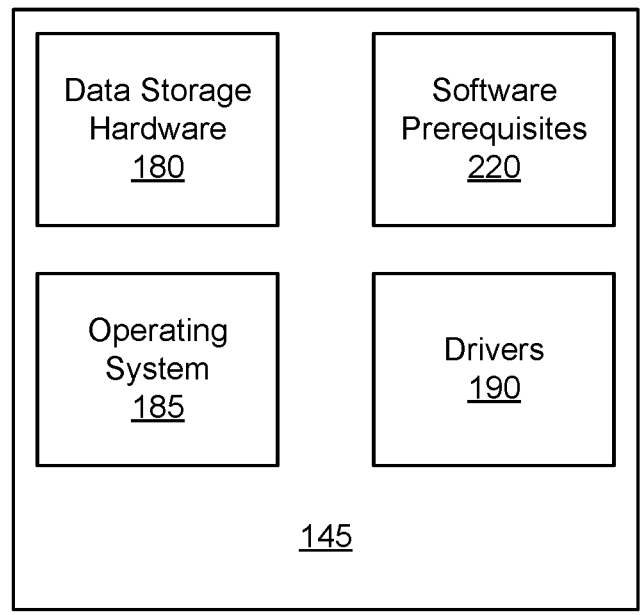

FIG. 6 is a schematic block diagram illustrating one embodiment of a data storage system 195 with data storage deployments 145. In the depicted embodiment, the data storage system 195 includes a plurality of data storage deployments 145. The data storage system 195 may include a plurality of data storage hardware 180. When a data storage deployment 145 is deployed to the data storage system 195, the data storage hardware 180 specified by the data storage parameters 175 may be activated for the data storage deployment 145. In addition, the software prerequisites 220, operating system 185, and drivers of the data storage deployment 145 specified by the data storage parameters 175 are installed to the data storage hardware 180. As a result, the data storage deployment 145 may be rapidly deployed to the data storage system 195, improving the efficiency of the data storage system 195 in providing data storage.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code that is executable by the processor to perform:
   generating one or more desired data storage parameters for a data storage deployment, wherein the data storage parameters identify data storage hardware and corresponding software prerequisites, an operating system, and drivers for deployment of the data storage hardware at a data storage system to provide the data storage from the data storage system;
   retrieving data storage parameters of validated data storage deployments from a data storage parameter repository, wherein each validated data storage deployment is successful deployed;
   identifying a first validated data storage deployment that has a greatest number of the desired data storage parameters of the validated data storage deployments from the data storage parameter repository, wherein the first validated data storage deployment is identified by:
   determining a filter threshold from filter training data;
   generating a soft score for each data storage deployment in the data storage parameter repository;
   identifying the validated data storage deployment with a highest soft score that satisfies the filter threshold; and
   in response to identifying the first validated data storage deployment, deploying the validated data storage deployment at the data storage system by activating the data storage hardware and installing the software prerequisites, the operating system, and the drivers of the first validated data storage deployment on the data storage hardware at the data storage system via a network.

2. The apparatus of claim 1, wherein the processor further performs:
generating a model data storage deployment;
validating the model data storage deployment using a test suite; and
in response to validating the model data storage deployment, storing the validated data storage deployment in the data storage parameter repository.

3. The apparatus of claim 1, wherein the processor further performs:
querying a deployed data storage deployment for performance data;
receiving the performance data from the deployed data storage deployment; and
storing the performance data.

4. The apparatus of claim 3, wherein the processor further performs:
receiving failure data;
calculating discrepancy data for the deployed data storage deployment from the failure data; and
storing the discrepancy data.

5. The apparatus of claim 4, wherein the discrepancy data is calculated as a function of hard failures and soft failures of the failure data and a hard failure threshold and a soft failure threshold.

6. The apparatus of claim 1, wherein the data storage system comprises a plurality of data storage deployments.

7. A method comprising:
generating, by use of a processor, one or more desired data storage parameters for a data storage deployment, wherein the data storage parameters identify data storage hardware and corresponding software prerequisites, an operating system, and drivers for deployment of the data storage hardware at a data storage system to provide the data storage from the data storage system;
retrieving data storage parameters of validated data storage deployments from a data storage parameter repository, wherein each validated data storage deployment is successful deployed;
identifying a first validated data storage deployment that has a greatest number of the desired data storage parameters of the validated data storage deployments from the data storage parameter repository, wherein the first validated data storage deployment is identified by;
determining a filter threshold from filter training data;
generating a soft score for each data storage deployment in the data storage parameter repository;
identifying the validated data storage deployment with a highest soft score that satisfies the filter threshold; and
in response to identifying the first validated data storage deployment, deploying the validated data storage deployment at the data storage system by activating the data storage hardware and installing the software prerequisites, the operating system, and the drivers of the first validated data storage deployment on the data storage hardware at the data storage system via a network.

8. The method of claim 7, wherein the method further comprises:
generating a model data storage deployment;
validating the model data storage deployment using a test suite; and
in response to validating the model data storage deployment, storing the validated data storage deployment in the data storage parameter repository.

9. The method of claim 7, wherein the method further comprises:
querying a deployed data storage deployment for performance data;
receiving the performance data from the deployed data storage deployment; and
storing the performance data.

10. The method of claim 9, the method further comprising:
receiving failure data;
calculating discrepancy data for the deployed data storage deployment from the failure data; and
storing the discrepancy data.

11. The method of claim 10, wherein the discrepancy data is calculated as a function of hard failures and soft failures of the failure data and a hard failure threshold and a soft failure threshold.

12. The method of claim 7, wherein the data storage system comprises a plurality of data storage deployments.

13. A computer program product for deploying a data storage deployment, the computer program product comprising a non-transitory computer readable storage medium having program instructions embodied therewith, the program instructions readable/executable by a processor to cause the processor to:
generating one or more desired data storage parameters for a data storage deployment, wherein the data storage parameters identify data storage hardware and corresponding software prerequisites, an operating system, and drivers for deployment of the data storage hardware at a data storage system to provide the data storage from the data storage system;
retrieving data storage parameters of validated data storage deployments from a data storage parameter repository, wherein each validated data storage deployment is successful deployed;
identifying a first validated data storage deployment that has a greatest number of the desired data storage parameters of the validated data storage deployments from the data storage parameter repository, wherein the first validated data storage deployment is identifiable by;
determining a filter threshold from filter training data;
generating a soft score for each data storage deployment in the data storage parameter repository;
identifying the validated data storage deployment with a highest soft score that satisfies the filter threshold; and
in response to identifying the first validated data storage deployment, deploying the validated data storage deployment at the data storage system by activating the data storage hardware and installing the software prerequisites, the operating system, and the drivers of the first validated data storage deployment on the data storage hardware at the data storage system via a network.

14. The computer program product of claim 13, wherein the processor further:
generates a model data storage deployment;
validates the model data storage deployment using a test suite; and in response to validating the model data storage deployment, stores the validated data storage deployment in the data storage parameter repository.

15. The computer program product of claim 13, wherein the processor further:
   queries a deployed data storage deployment for performance data;
   receives the performance data from the deployed data storage deployment; and
   stores the performance data.

16. The computer program product of claim 15, wherein the processor further:
   receives failure data;
   calculates discrepancy data for the deployed data storage deployment from the failure data; and
   stores the discrepancy data.

17. The computer program product of claim 16, wherein the discrepancy data is calculated as a function of hard failures and soft failures of the failure data and a hard failure threshold and a soft failure threshold.

* * * * *